Figure 4:
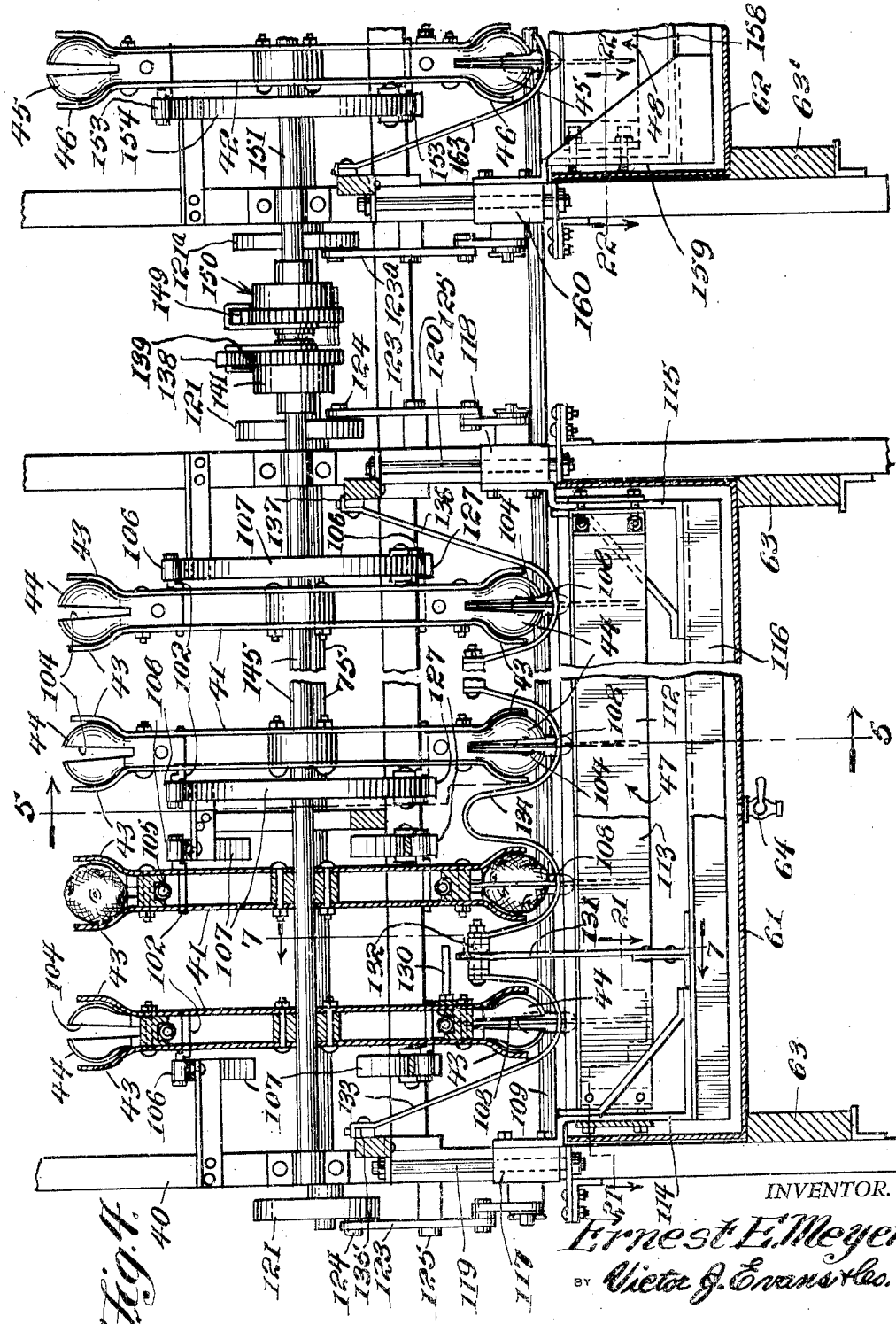

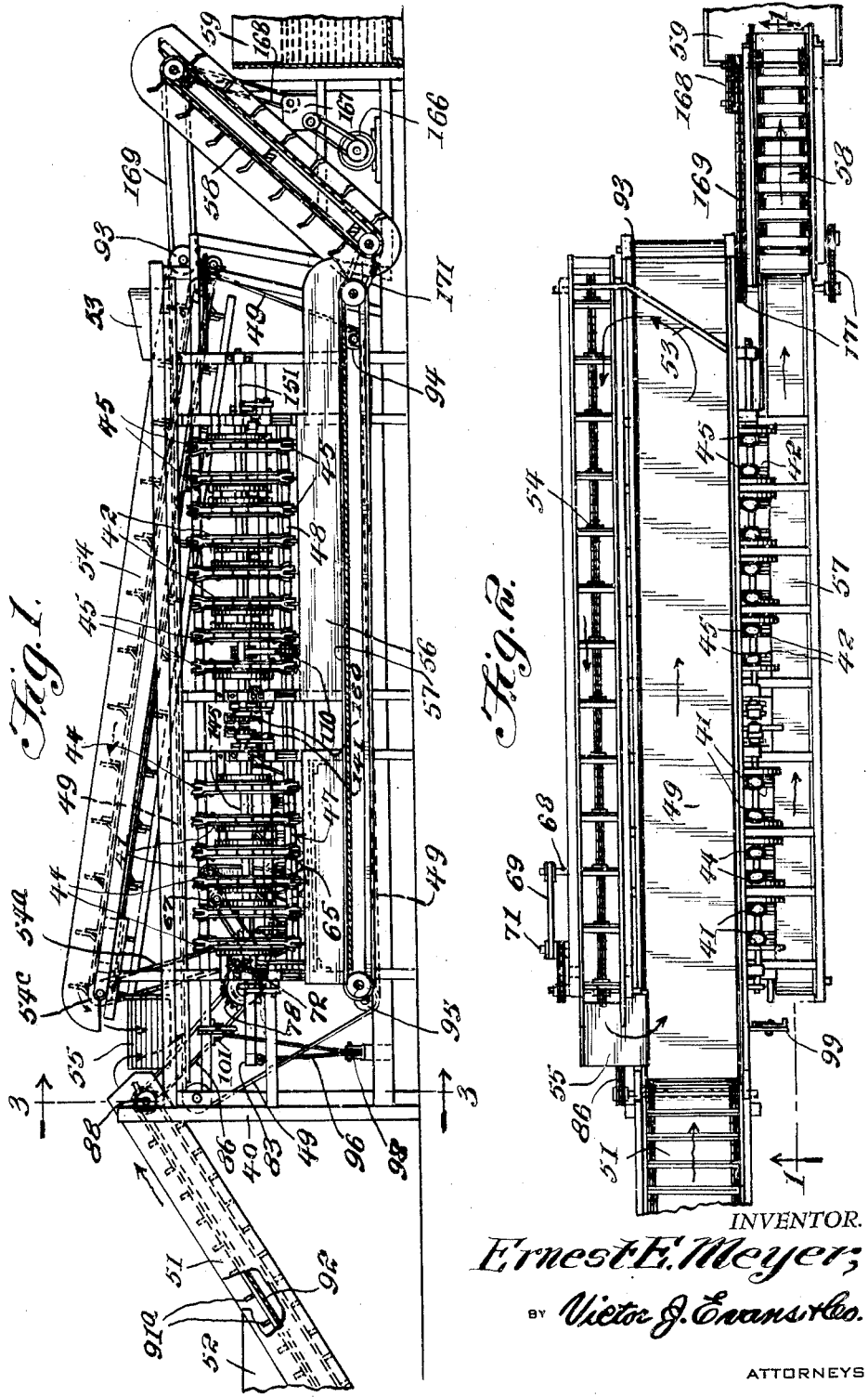

Nov. 8, 1949 E. E. MEYER 2,487,719
POTATO CUTTER
Filed Aug. 20, 1948 8 Sheets-Sheet 2
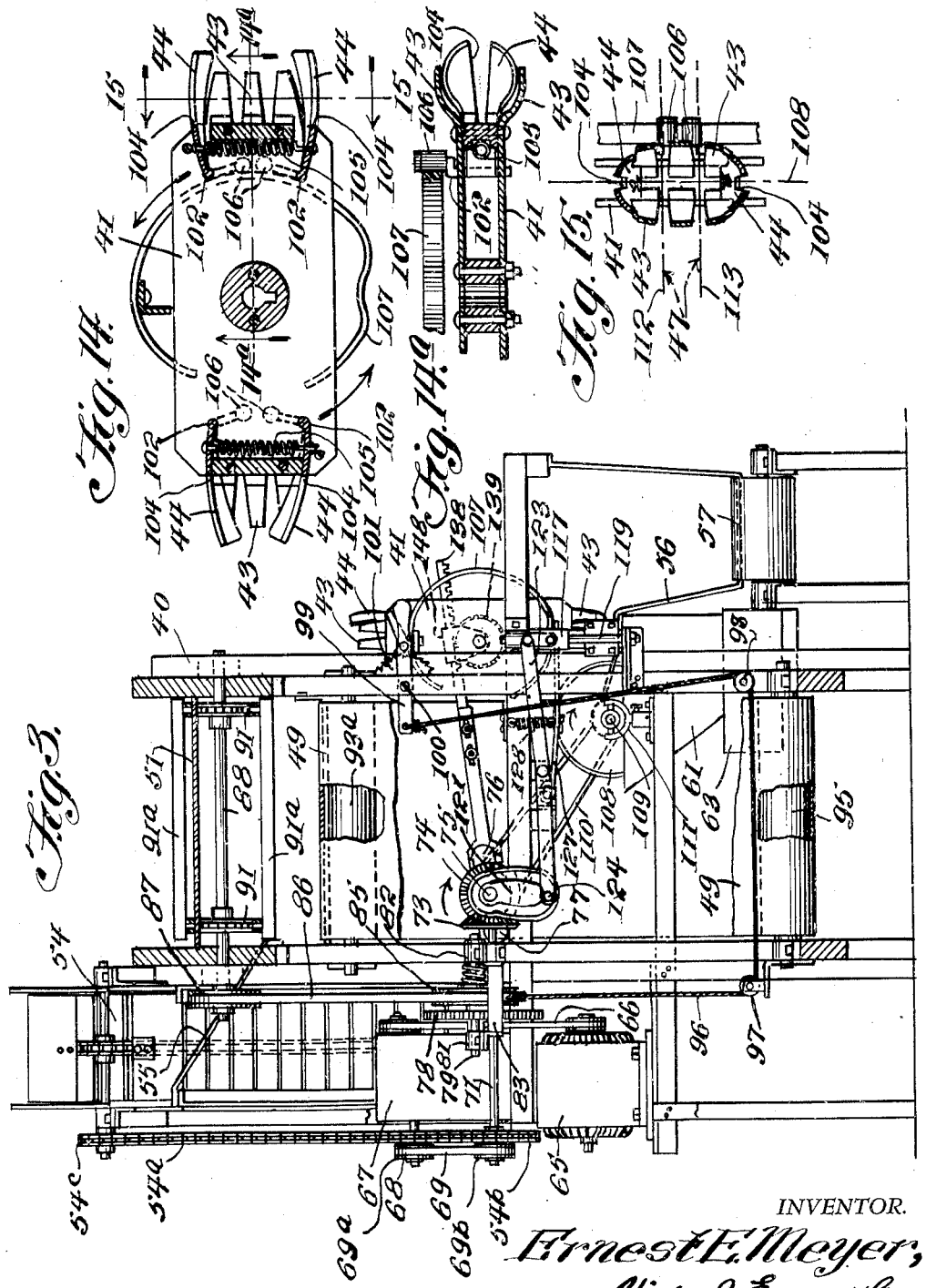
INVENTOR.
Ernest E. Meyer,
BY Victor J. Evans & Co.
ATTORNEYS Nov. 8, 1949　　　　　E. E. MEYER　　　　　2,487,719
POTATO CUTTER
Filed Aug. 20, 1948　　　　　　　　　　　8 Sheets-Sheet 4
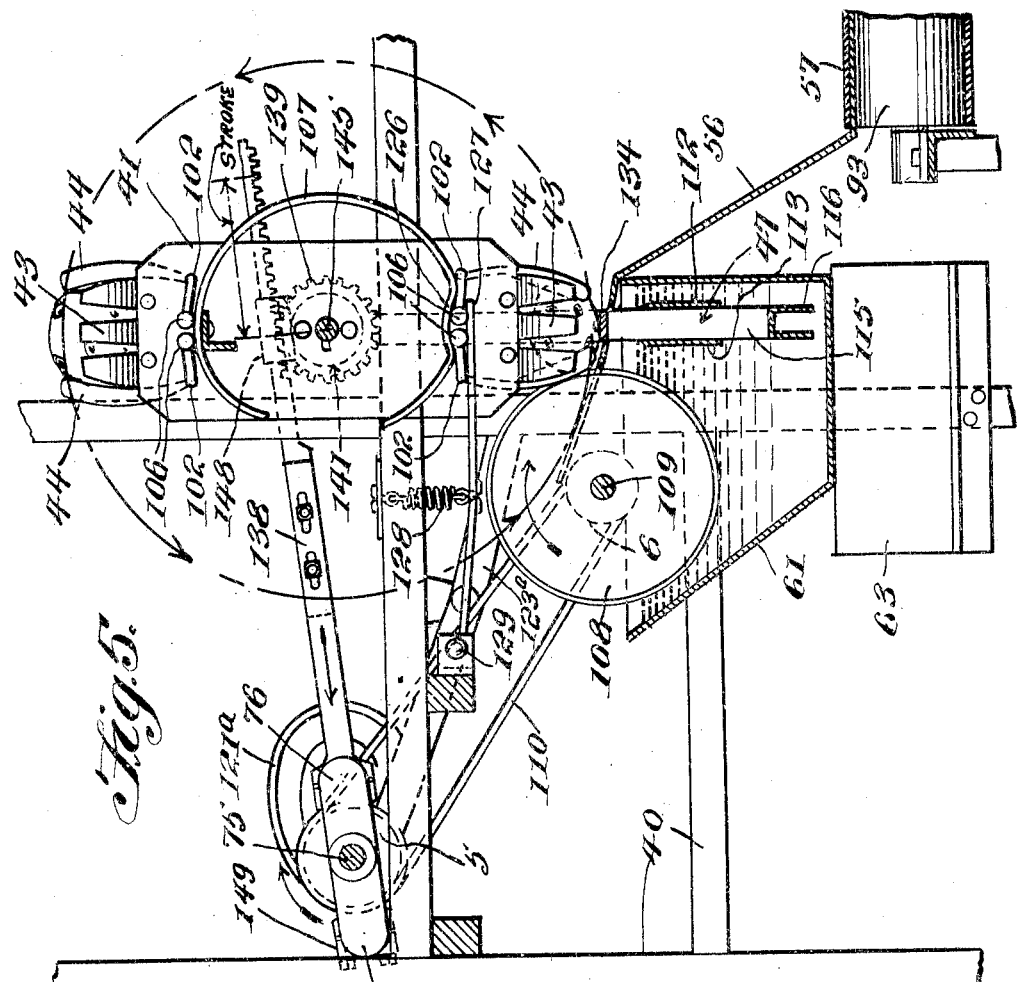
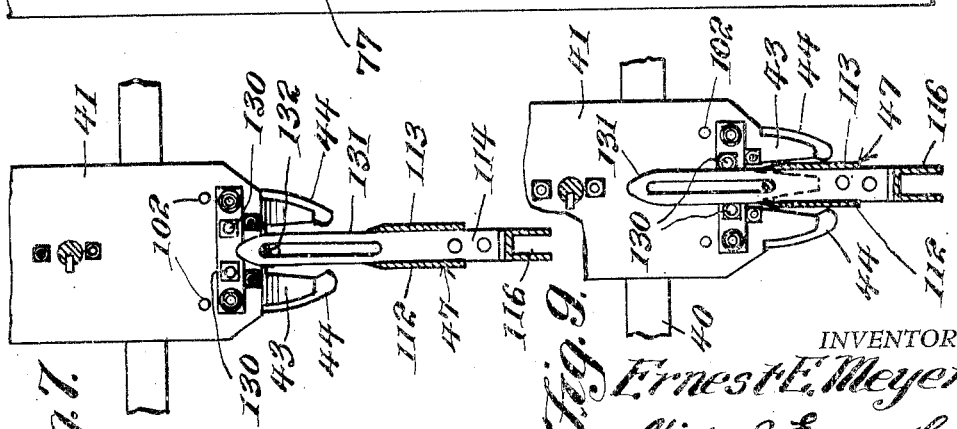
INVENTOR.
Ernest E. Meyer,
BY Victor J. Evans & Co.
ATTORNEYS

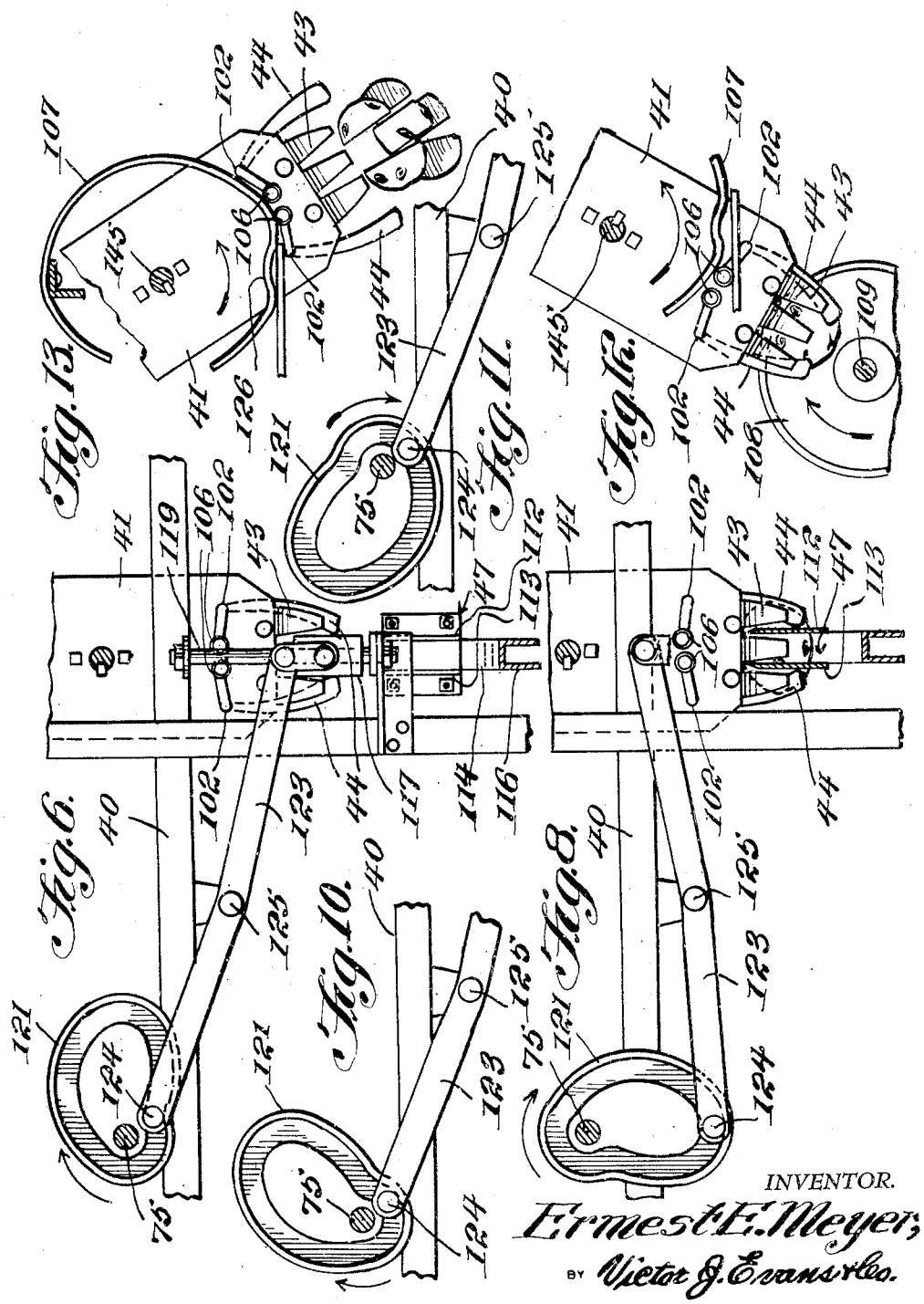

Nov. 8, 1949     E. E. MEYER     2,487,719
POTATO CUTTER
Filed Aug. 20, 1948     8 Sheets-Sheet 6
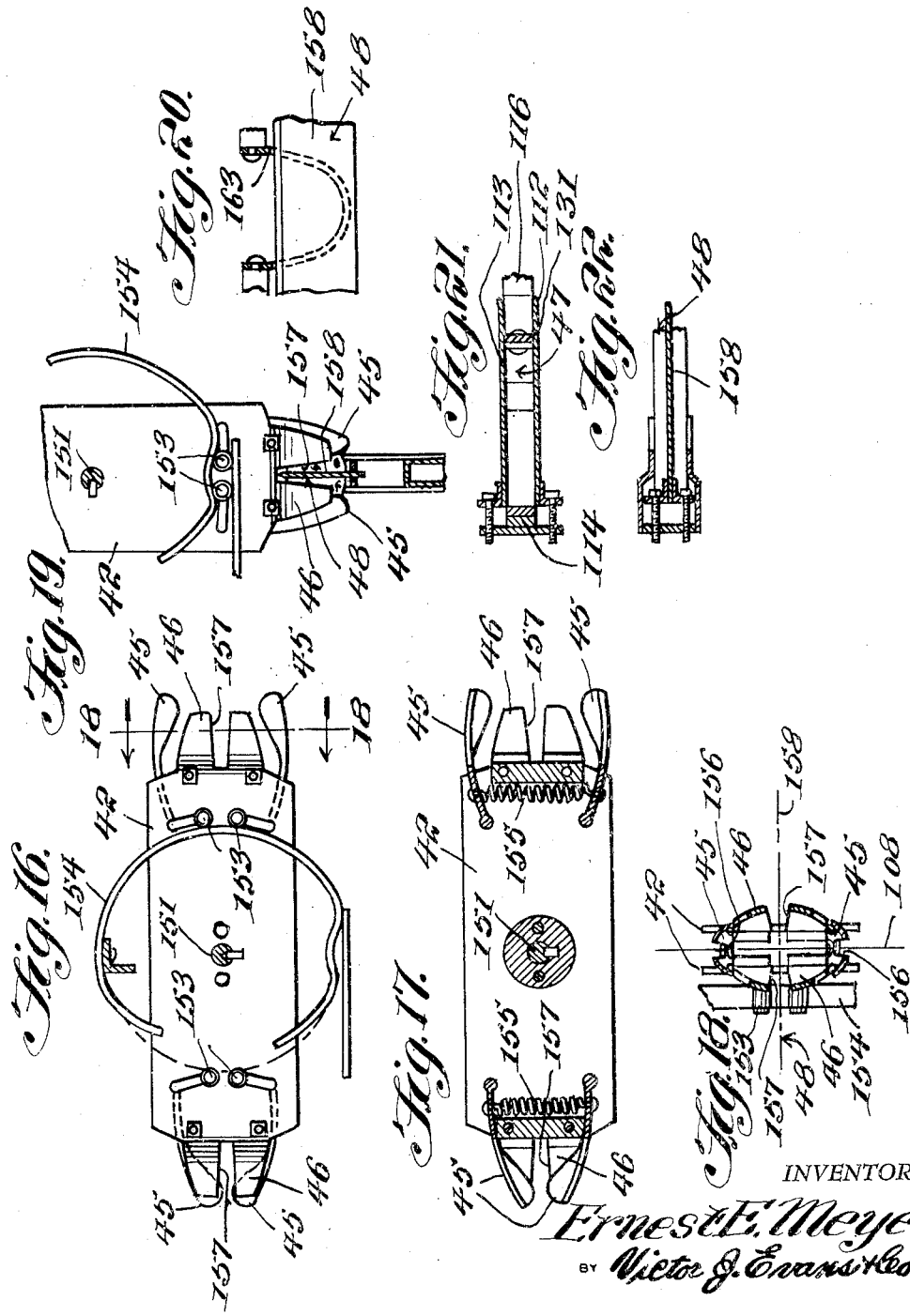
INVENTOR.
Ernest E. Meyer,
BY Victor J. Evans & Co.
ATTORNEYS

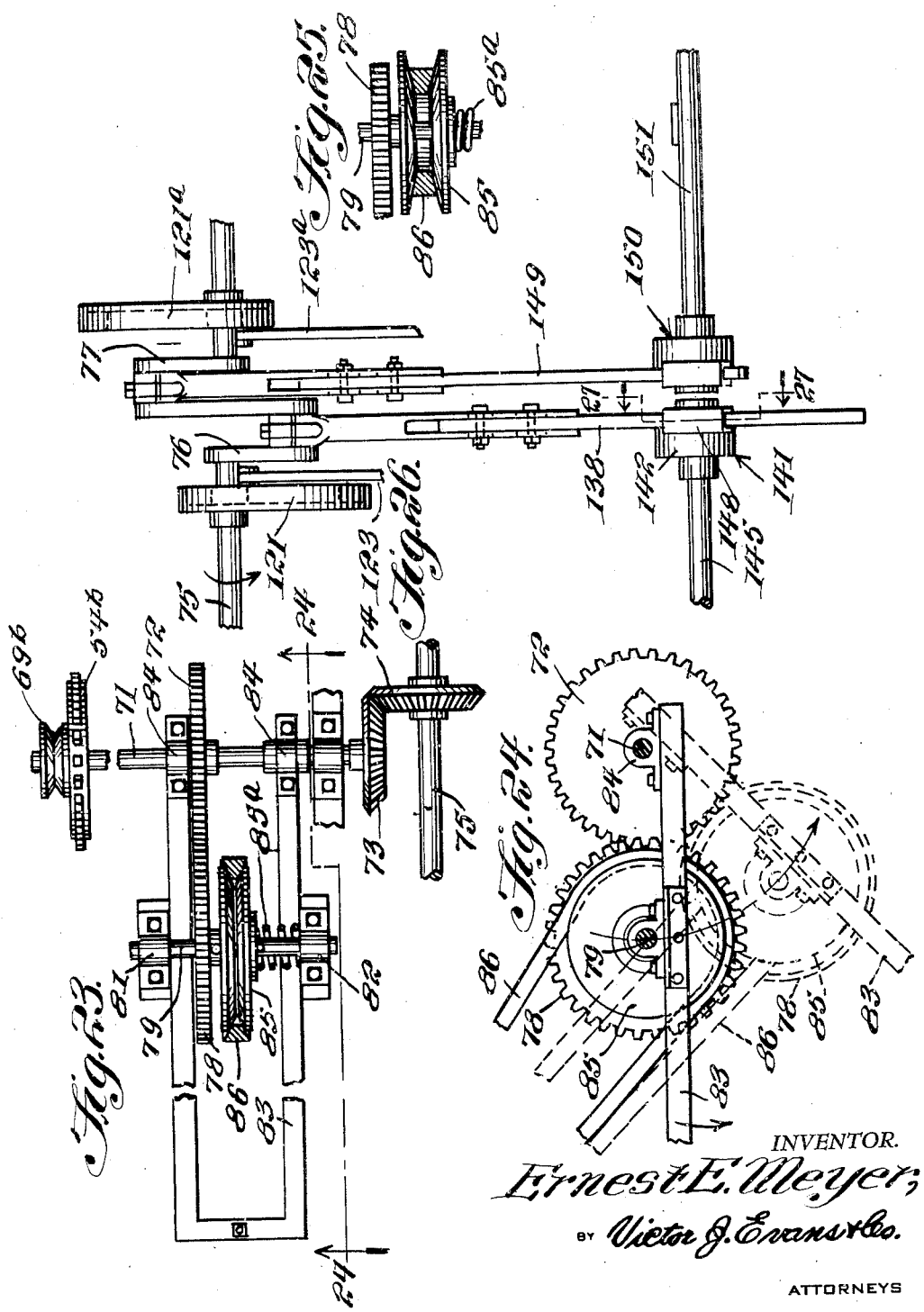

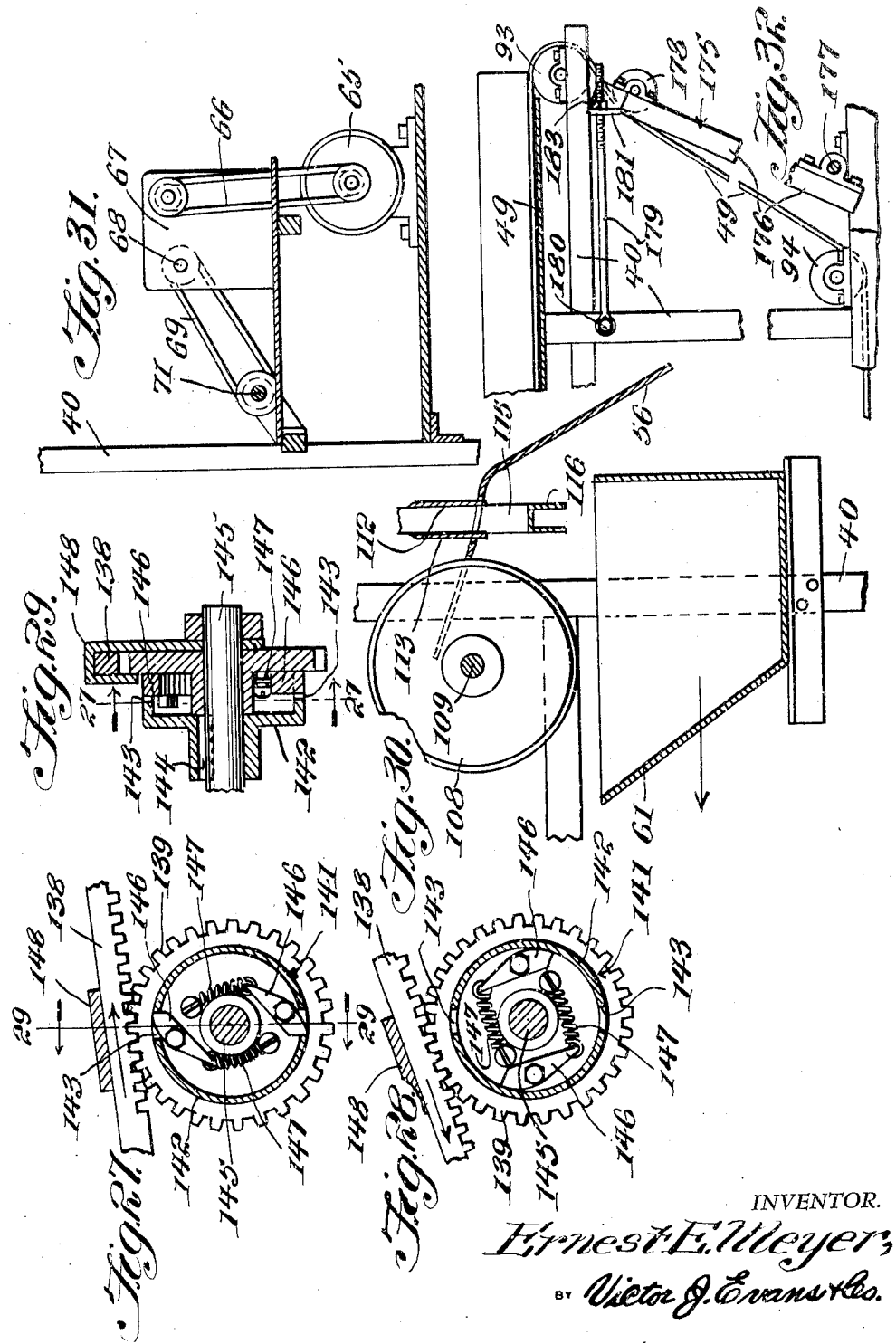

Patented Nov. 8, 1949

2,487,719

UNITED STATES PATENT OFFICE 2,487,719

POTATO CUTTER

Ernest E. Meyer, Anaconda, Mont.

Application August 20, 1948, Serial No. 45,250

12 Claims. (Cl. 146—78)

This invention relates to a potato cutting machine for cutting seed potatoes.

It is an object of the present invention to provide a potato cutting machine which is substantially automatic in operation wherein potatoes deposited in a hopper are inserted in jaws on carrier elements whereby the potatoes are subjected to being cut from different angles to provide seed potato elements and wherein conveyor means is provided for locating the potatoes adjacent the carriers so that they are easily accessible for insertion into the jaws, and wherein the seed potato elements upon being discharged from the jaws are conveyed automatically away from the machine and deposited in a bin. The invention also includes means whereby potatoes which are not used in the carriers are returned automatically to the starting end of the potato conveyor to be again conveyed to the operators of the machine. A further object of the invention is to provide a seed potato cutter having cutting knives wherein means is provided for disinfecting the knives after cutting each potato.

The invention also includes a bath at the end of the machine into which the cut sections of the potatoes are deposited for treatment before planting.

Other objects of the present invention are to provide a potato cutting machine adapted to handle large quantities of potatoes which is of simple construction, has independent power means for the several working parts, has an adjustable seed potato carrier from which potatoes are taken, is easy to operate and efficient in operation.

For other objects and for a better understanding of the invention, reference may be had to the following detailed description taken in connection with the accompanying drawings in which Figure 1 is a side elevational view, with parts in section showing the potato seed cutter as viewed on line 1—1 of Figure 2 and looking in the direction of the arrows thereof, Figure 2 is a top plan view of the potato cutter, Figure 3 is an enlarged sectional view, with parts in elevation, taken on line 3—3 of Figure 1 and looking in the direction of the arrows thereof, Figure 4 is an enlarged fragmentary side elevational view of the potato cutter with portions broken away and shown in section, Figure 5 is an enlarged fragmentary and transverse sectional view taken generally on line 5—5 of Figure 4 and looking in the direction of the arrows thereof with the near cam omitted, Figure 6 is a fragmentary elevational view of the double knife operating mechanism with the cam positioned so that the knife is in the down position, Figure 7 is a fragmentary and sectional view of the double knife mechanism as viewed on line 7—7 of Figure 4, Figure 8 is a fragmentary elevational view similar to Figure 6 with the cam positioned to actuate the knife to the raised or cutting position, Figure 9 is a fragmentary sectional view similar to Figure 7 but with the knife in the raised position, Figures 10 and 11 are respectively fragmentary views of the knife mechanism operating cam disposed at positions to retain the knife mechanism at elevations intermediate to the elevations shown in Figures 6 and 8, Figures 12 and 13 are respectively fragmentary elevational views of the jaws for retaining the potato while being cut, the cam for operating the jaws and the respective views showing the jaws closed upon a potato being cut in Figure 12 and opened to release the cut potato in Figure 13, Figure 14 is a transverse sectional view through one of the potato carriers showing the operating cam therefor and illustrating a carrier in which large potatoes are held which are cut into six pieces, Figure 14a is a sectional plan through one of the potato carriers taken on line 14a—14a of Figure 14, showing the potato holding jaws with one of the rollers and cam for operating the same, Figure 15 is a detail sectional view taken through one of the jaw devices and taken on line 15—15 of Figure 14, Figure 16 is an elevational view of one of the potato carriers with its operating cam, said carrier adapted to receive the small potatoes and to hold the potatoes while subjected to a single movable knife and the cutting disk whereby to cut the potato into four parts, these jaw carriers being located along the rear portion of the potato seed cutting machine, Figure 17 is a sectional view through the potato carrier shown in Figure 16, Figure 18 is a sectional view taken through the potato jaws of the carrier shown in Figure 16 and on line 18—18 thereof, Figure 19 is a fragmentary elevational view of the jaws into which a single blade is extended for cutting the smaller potatoes and showing the cam for operating the jaws, Figure 20 is a fragmentary sectional view taken through the stripper element for the single blade, Figure 21 is a sectional view taken through the blades of the double knife and on line 21—21 of Figure 4, Figure 22 is a fragmentary sectional view taken through the single knife and on line 22—22 of Figure 4, Figure 23 is fragmentary top plan view of the transmission mechanism driven from the reduction gearing, Figure 24 is a sectional view of the driving mechanism shown in Figure 23 and as viewed on line 24—24 thereof, Figure 25 is a detail sectional view showing the V-drive pulley of Figure 23 expanded to drive the mechanism at a slow speed, Figure 26 is a plan view showing the crankshaft section of the ratchet mechanism for driving the potato carriers, Figure 27 is a sectional view taken through the ratchet element and on line 27—27 of Figures 26 and 29, with the ratchet parts in engagement with a drum for rotating the shaft and carriers, Figure 28 is a sectional view similar to the view shown in Figure 27, but with the rack in the returning position in which the carriers are not actuated, Figure 29 is a fragmentary longitudinal sectional view taken through the ratchet parts and generally on line 29—29 of Figure 27, Figure 30 is a fragmentary sectional view similar to Figure 5 with the supporting blocks removed and showing the tank in its lowered position to effect removal thereof for cleaning, Figure 31 is a sectional view, with parts in elevation, looking toward the motor for driving the potato carriers and conveyors associated therewith and showing the reduction gearing and drive belts connected therewith, and Figure 32 is a sectional view showing a detail of a belt tightening device for the potato conveyor and with parts broken away.

Referring now particularly to Figures 1, 2, 3 and 4, the seed potato cutter comprises generally a long supporting frame 40 including vertical and horizontal members. The machine is divided into two sections with the first section provided with potato carriers 41 for the larger potatoes and the second section having carriers 42 for the smaller potatoes. The carriers 41 are formed with spaced plates having outwardly bowed stationary jaws 43 on the ends thereof and gripping jaws 44 are releasably mounted in the plates and positioned between the jaws 43. The carriers 42 are provided with gripping jaws 45 which are releasably mounted between fixed arcuate outwardly bowed jaws 46 on the ends of the plates of the carriers.

The potatoes placed in the jaws of the carriers 41 of the forward part of the machine are cut by double knives 47 and the potatoes in the carriers 42 in the latter part of the machine are cut by single knives 48.

The potatoes are taken by hand from a conveyor 49 which extends along the upper part of the frame and returns through the bottom of the frame. Potatoes are elevated to the conveyor 49 by an inclined conveyor 51 having a hopper 52 into which the potatoes are dumped. These potatoes are dropped onto the conveyor 49 at one end of the machine. Operators will stand at the side of the conveyor 49 and place by hand the potatoes into the jaws 44 and 45 as the conveyor carries the potatoes through the frame. Such potatoes as are not picked up, are guided by a vertically-extending plate 53 located at the end of the conveyor 49, Figure 2, to an inclined return conveyor mechanism 54 located at the rear of the machine and adapted to move the potatoes along the rear of the machine and onto a chute 55 to be again deposited on the receiving end of the conveyor 49.

The carrier jaws after leaving the cutting stations travel outwardly and the jaws are released to drop the potato sections onto an apron 56 over which the sections will drop to a conveyor belt 57 for delivering the sections through the lower part of the frame to an inclined elevator 58 located at the side of the frame for delivery into a protective solution in a container 59 from which the sections will be taken for use in the potato planter. Beneath the respective knife mechanisms 47 and 48 are tanks 61 and 62 which hold a disinfectant solution to sterilize the cutting blades after each potato is cut. This prevents transfer of disease from one potato to another. The tanks are supported upon removable blocks 63 and 63', Figure 4, which upon being removed will permit the tank to be lowered and removed for the purpose of being cleaned. A drain cock 64 is provided in each tank for removing the disinfectant when a clean solution is required.

At the receiving end of the frame there is mounted a driving electric motor 65, Figures 3 and 31 which is connected by a driving belt 66 with a reduction gear device 67 which has an output shaft 68 that drives a drive shaft 71 through a belt 69 and pulleys 69a and 69b, as shown in Figures 23 and 24. The shaft 71 is journalled on the frame 40 and a large gear 72 is mounted thereon with a bevel gear 73 at the end of the shaft. The bevel gear 73 meshes with a bevel gear 74 on a longitudinally extending shaft 75 which extends along the rear of the frame and has a crankshaft section therein with crank arms 76 and 77, the arms being positioned at an angle of one hundred and eighty degrees apart as shown in Figure 26.

The gear 72 on the shaft 71, Figure 23, meshes with a gear 78 on a shaft 79 which is journalled in bearings 81 and 82 mounted on the sides of a feed control frame 83 pivotally connected through bearings 84 to the shaft 71 for vertical adjustment. The shaft 79 has a variable speed pulley 85 thereon into which a V-belt 86 is trained which is also trained over a pulley 87 on a drive shaft 88 of the potato feed conveyor 51, Figure 3. The speed of the feed conveyor may, therefore, be adjusted by the position of the belt in the pulleys. The sides of the variable speed pulley 85 are resiliently held against the belt by a spring 85a. The shaft 88 is journaled on the frame and has driving sprockets 91 for chains of scrapers 91a that travel over the apron 92. The potatoes drop from the feed conveyor 51 to the apron of the conveyor 49 which extends over rollers 93a and 93 in the upper part of the machine and downwardly to the bottom of the frame for return over rollers 94 and 95 journaled along the lower portion of the frame.

To effect the vertical adjustment of the frame 83 and hence the adjustment of the V-belt 86 within the variable speed pulley 85 as to effect either a small or fast drive of the potato feed conveyor 51, Figures 23 and 25, a cable 96 is extended downwardly over a pulley 97 to a pulley 98, Figure 3, and upwardly to the end of a manually operable lever 99 pivotally mounted on a pin 100 and adapted to be adjusted and retained by a ratchet and quadrant 101. The feed conveyor 51 can thus be made to run slow or fast depending upon the speed of the operators. The shaft 71 also drives the conveyor 54 through a chain 54a and sprockets 54b and 54c.

The jaws 44 of the carriers 41 are hinged by pins 102 in openings 103 of the side plates of the carriers and the ends of the jaws are provided with slots 104 to receive the circular cutting knives 108. The jaws are resiliently urged together by springs 105 and rollers 106 on the offset ends of the pins 102 provide cam followers that travel on the stationary cam track 107.

The track is open at one side to permit the followers to leave the same and the jaw sections to close whereupon to retain the potatoes while being transported from a top position to a low cutting position. The jaws remain closed at their lowered position where the carrier is held stationary to permit the upward slicing movement of the double knives 47 to sever the potatoes through their short dimension.

As the potatoes approach the lowered position they are cut through their long dimension by cutting disks 108, Figure 4, fixed to a shaft 109 which extends longitudinally throughout the frame and is driven by a belt 110, Figure 3, from shaft 75 through pulleys 5 and 6. The shaft 109 is supported in adjustable bearings 111 on the frame.

The double knife mechanism 47 comprises blades 112 and 113, Figures 4 and 5, connected between the ends of hanger brackets 114 and 115 which are connected together by the channel member 116 and which are respectively connected to slides 117 and 118 respectively slidable on vertical rods 119 and 120, Figure 4. On shaft 75 are cams 121 and 121a to which are respectively connected levers 123 and 123a having respectively rollers 124. The cams 121 and levers 123 actuate the double knives at the forward part of the machine and the cams 121a and levers 123a actuate the single knives in the latter section of the machine. The cams are similar and the same description will apply to both. The levers 123 are pivoted at 125, Figure 3, and are connected to the respective slides 117 and 118 to elevate the same to effect the slicing action upon the potatoes confined within the jaws on the carriers. At this time the followers 106 are confined within indentation 126 of cam track 107 by a strap 127, Figure 5, held up by a tension spring 128 and pivoted at 129 on the frame 40.

A pair of pins 130 extend from one side of the carriers, Figure 4, which are positioned to engage a vertically extending guide 131 extending upwardly from the horizontal member 116 of the knife mechanism 47 to lock the carriers. The upper end of the guide rod 131 is confined within a connection 132 between stripper member 133 and 134 extending longitudinally of the frame and over which the knife blades are extended. When the knife blades are retracted, the stripper members will confine the potato sections to the jaws. The stripper member 133 is connected to the frame as indicated at 135. A similar stripper member 136 is connected to the frame as indicated at 137. As the knife mechanism drops the rod 131 will be disengaged from the pins 130 to allow the carrier to be rotated.

The carriers are rotated in half revolution steps. This motion is effected to the first set of carriers by a rack bar 138 from crank 76, Figure 26, which meshes with a gear 139 of a ratchet device 141, Figures 27, 28 and 29. The ratchet device coacts with a drum 142 having openings 143 therein and the drum is held by a key 144 to carrier shaft 145. To the gear 139 there is pivoted dogs 146 which are urged outwardly against the drum and into the openings thereof by springs 147. A guide 148, Figure 29, maintains the rack bar 138 in mesh with gear 139. The shaft will be rotated in one direction by the rack, as illustrated in Figure 27, until it has been turned one half revolution whereas to position another set of potato jaws above the double knife mechanism, and in the return movement of the rack the dogs move out of the openings as shown in Figure 28, and the shaft remains stationary, the carriers and shaft being held by the guide rod 131 as shown in Figure 9.

A similar arrangement is provided for rotating carriers 42. This mechanism comprises a rack 149 connected to crank 77, Figure 26, which drives a ratchet mechanism 150 connected to shaft 151 of the carriers 42. The carriers 42 are constructed similarly to carriers 41 except that the jaws 45 thereof are adapted to retain small potatoes. Instead of having six jaw sections to obtain a six piece cut, there are only four jaw sections to provide a four piece cut. The jaws have cam followers 153 adapted to operate on cam trucks 154, Figures 16, 17, 18 and 19. Springs 155 pull the end jaws 45 together. The jaws have single slots 156 for receiving the disks 108. The jaws 46 have single slots 157 in which a single knife blade 158 is extended to cut the potato through its short dimension. This blade 158 is a part of the knife mechanism 48 and is carried on hangers 159 extending from slides 160 and operated through levers 123a connected with cams 121a on the shaft 75. Stripper elements 163 are slit to receive the single knife blade 158 and prevent the sliced sections of the potato from leaving the jaws 45 upon the single knife mechanism being retracted.

On the frame is a second electric motor 166, Figure 1, which is connected to a reduction gear unit 167 which drives through a chain 168, the elevator mechanism 58. Extending from the upper end of the elevator mechanism is a chain 169 which is connected to the drive roller 93 of the belt conveyor 49 to drive it. The bottom conveyor 57 is driven from the lower end of the elevator 58 by chain 171.

In Figure 32, there is shown a belt tightening device 175 for the main conveyor 49. The tightening device comprises an arm 176 pivoted to the frame at 177 and having an idler roller 178 adapted to bear against the conveyor belt 49. A link 179 is pivotally connected at 180 with the frame and extends through a projection 181 on the member 176 to be held by an adjustable nut 183 which can be tightened to place the desired tension upon the belt 49.

The operator stands by and feeds the potatoes to the jaws as the carriers are stopped. The movement of the carriers is automatic and the movement of the knife mechanisms are timed to cut the potatoes while the jaws containing them are at the low position.

The potato sections drop to the bottom conveyor 57 and are elevated by the elevator 58 for deposit in the container 59.

It should be apparent that there has been provided a potato cutting machine having tanks holding disinfectant solution and adapted to receive the cutting blades after each potato has been cut. This will prevent the disease of one potato from being spread to the other potato on the next cut.

It should be further apparent that there has been provided a potato cutting machine wherein all of the potato slices will be of uniform size. The large potatoes are fed to one set of jaws to have six slices formed of the same while the smaller potatoes are placed in the smaller jaws to have four slices. The slices will be nearly uniform in size. Accordingly, when the slices are used in the potato planting machine, only one will pass the planter at a time. If the slices are not uniform, then it would be possible that two might be passed through the planter at one time and a double planting would result and consequently a waste of seed. It should thus be apparent that there has been provided a machine which cuts potatoes in uniform size and wherein a system is provided so that the disease of one potato is not transferred to another.

While various changes may be made in the detailed construction, it shall be understood that such changes shall be within the spirit and scope of the present invention as defined by the appended claims.

What is claimed is:

1. A potato cutting machine comprising a supporting frame, a conveyor extending across the supporting frame and adapted to carry potatoes, power means for operating the conveyor, a rotatable carrier having jaws thereon adapted to receive potatoes taken from the potato conveyor, means connected with the power means for effecting the rotation of the carrier in a step by step manner, knife elements extended through the potato in one direction as the carrier is rotated, and further knife mechanism adapted to be extended into the potato in a transverse direction and connected to the power mechanism to be operated thereby, stripper means associated with the latter knife mechanism, and means for releasing the jaws as the carrier is rotated to discharge the potato sections, and conveyor means for receiving the potato sections and conveying them from the machine.

2. A potato cutting machine comprising a frame, a jaw carrier rotatable on the frame, jaws on the carriers and means for opening and closing the jaws as the carrier is rotated, a disk knife adapted to enter the jaws and cut the potatoes in one direction as the carrier is rotated, a slide knife adapted to be elevated to cut the potatoes in another direction when the carrier has been stopped, and common power means for operating the carrier, the disk knife and the slide knife.

3. A potato cutting machine comprising a frame, a jaw carrier rotatable on the frame, jaws on the carrier and means for opening and closing the jaws as the carrier is rotated, a disk knife adapted to enter the jaws and cut the potatoes in one direction as the carrier is rotated, and a slide knife adapted to be elevated to cut the potatoes in another direction when the carrier has been stopped, and common power means for operating the carrier, the disk knife and the slide knife, and said power means including step by step mechanism for operating the jaw carrier.

4. A potato cutting machine comprising a frame, a jaw carrier rotatable on the frame, jaws on the carrier and means for opening and closing the jaws as the carrier is rotated, a disk knife adapted to enter the jaws and cut the potatoes in one direction as the carrier is rotated, a slide knife adapted to be elevated to cut the potatoes in another direction when the carrier has been stopped, common power means for operating the carrier, the disk knife and the slide knife, said power means including step by step mechanism for operating the jaw carrier, and a potato conveyor connected to the frame for movement therethrough and said power means being connected to the conveyor to operate the same.

5. A potato cutting machine as defined in claim 4 and a manually adjustable variable speed device in the connection of the power means with the conveyor.

6. A potato cutting machine comprising a supporting frame, a conveyor extending across the supporting frame and adapted to carry potatoes, power means for operating the conveyor, a rotatable carrier having jaws thereon adapted to receive potatoes taken from the potato conveyor, means connected with the power means for effecting the rotation of the carrier in a step by step manner, knife elements extended through the potato in one direction as the carrier is rotated, and further knife mechanism adapted to be extended into the potato in a transverse direction and connected to the power mechanism to be operated thereby, stripper means associated with the latter knife mechanism, and means for releasing the jaws as the carrier is rotated to discharge the potato sections, and conveyor means for receiving the potato sections and conveying them from the machine, and a return conveyor connected to the frame and returning such potatoes as fail to be placed in the carrier jaws at the receiving end of the potato conveyor, and guide means at the end of the potato conveyor for diverting the unused potatoes to the return conveyor.

7. A potato cutting machine comprising a supporting frame, a conveyor extending across the supporting frame and adapted to carry potatoes, power means for operating the conveyor, a rotatable carrier having jaws thereon adapted to receive potatoes taken from the potato conveyor, means connected with the power means for effecting the rotation of the carrier in a step by step manner, knife elements extended through the potato in one direction as the carrier is rotated, and further knife mechanism adapted to be extended into the potato in a transverse direction and connected to the power mechanism to be operated thereby, stripper means associated with the latter knife mechanism, means for releasing the jaws as the carrier is rotated to discharge the potato sections, conveyor means for receiving the potato sections and conveying them from the machine, a conveyor for receiving the potato sections upon the same being discharged from the jaws, and an elevating device for receiving the potato sections from the last mentioned conveyor and for elevating the same to a receptacle for delivery to a potato planter.

8. A potato cutting machine comprising a supporting frame, two jaw carriers axially aligned with one another and journalled respectively in the frame, power means for operating the carriers including a shaft with cranks therein, racks extending from the cranks and ratchet mechanisms associated with the carriers and adapted to be operated by the racks, one of said carriers having jaws adapted to receive large potatoes and the other of said carriers having jaws adapted to receive small potatoes, a common shaft having disk knives for entering the jaws to cut the potatoes confined therein in one direction, means connecting the disk shaft to the crank shaft to be operated by the crank shaft, vertically-adjustable knife mechanisms disposed beneath the respective carriers and adapted to be elevated to slice the potatoes within the jaws from a different direction, and lever and cam means connecting the knife mechanisms with the crank shaft to be operated by the crank shaft, said power means further including a motor operated reduction gear connected to said crank shaft to drive the same.

9. A potato cutting machine as defined in claim 3 and a tank containing a disinfectant solution disposed about the disk and slide knives whereby to disinfect the same after every cut of a potato.

10. In a seed potato cutting machine, a main horizontally disposed potato carrying conveyor, a feed conveyor for delivering potatoes to the main conveyor, a plurality of potato carriers positioned along the said main conveyor, potato gripping jaws carried by opposite ends of the carriers, means rotating the carriers, slicing means for cutting potatoes in the carriers, and means releasing potato sections from the gripping jaws of the carriers.

11. In a seed potato cutting machine, a main horizontally disposed potato carrying conveyor, a feed conveyor for delivering potatoes to the main conveyor, a plurality of potato carriers positioned along the said main conveyor, potato gripping jaws carried by opposite ends of the carriers, means rotating the carriers, slicing means for cutting potatoes in the carriers, means releasing potato sections from the gripping jaws of the carriers, a solution holding tank at the end of the machine, and means conveying the potato sections to the tank.

12. In a seed potato cutting machine, a main horizontally disposed potato carrying conveyor, a feed conveyor for delivering potatoes to the main conveyor, a plurality of potato carriers positioned along the said main conveyor, potato gripping jaws carried by opposite ends of the carriers, means rotating the carriers, slicing means for cutting potatoes in the carriers longitudinally and transversely, and means releasing potato sections from the gripping jaws of the carriers.

ERNEST E. MEYER.

No references cited